May 22, 1956     D. W. BARKLEY     2,746,354
REARVIEW MIRROR
Filed May 27, 1949
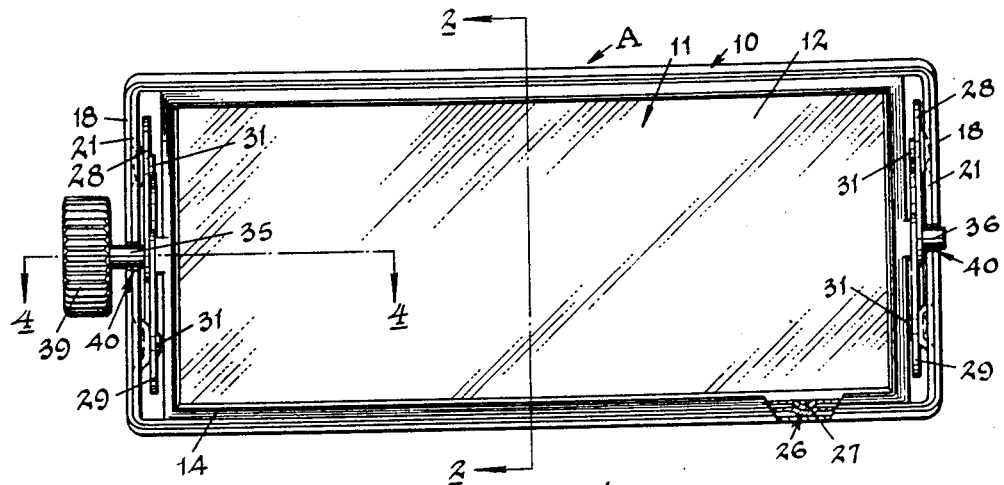
Fig. 1
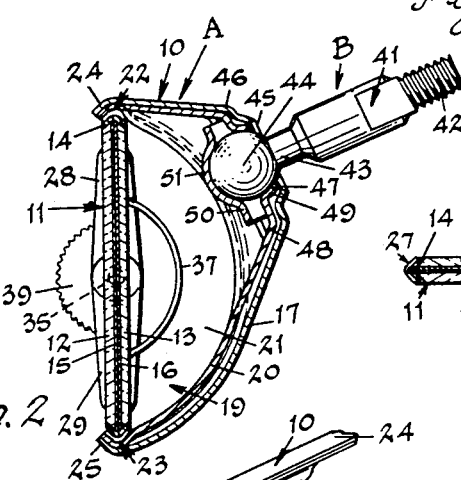
Fig. 2
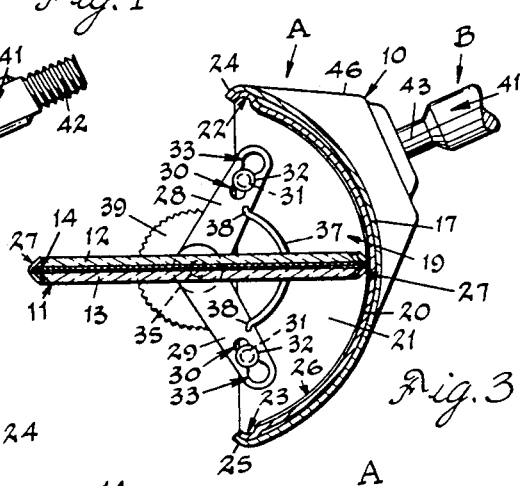
Fig. 3
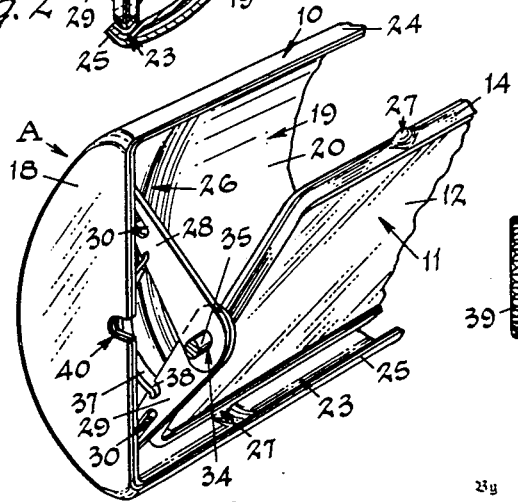
Fig. 5
Fig. 4
Inventor
Dwight W. Barkley
Nobbe & Swope
Attorneys United States Patent Office 2,746,354
Patented May 22, 1956

2,746,354

REARVIEW MIRROR

Dwight W. Barkley, Cheswick, Pa., assignor to Libbey-Owens-Ford Glass Company, Toledo, Ohio, a corporation of Ohio Application May 27, 1949, Serial No. 95,743

10 Claims. (Cl. 88—77)

The present invention relates to rear view mirrors such as employed in automobiles and the like of the character which enables the driver of the vehicle to have a clear view of the rear road conditions at all times.

More particularly, this invention has to do with that type of rear view mirror having two reflective surfaces of different reflecting power and being reversible so that either surface may be brought into operative position by the driver of the vehicle; one reflective surface being in the form of an ordinary mirror for use in day driving, and the other providing a mirror for night driving which will reduce the brilliancy of the reflecting headlights of an automobile approaching from the rear.

A primary object of the invention is the provision of a rear view mirror of the above type embodying means of a novel and improved character which will enable the driver to reverse the mirror in a rapid, efficient manner and with a minimum of care and attention on his part.

Another object of the invention is the provision of a rear view mirror embodying a supporting housing or case with which the mirror proper is associated for both bodily and rotatable movement so that it may be readily reversed to selectively bring either of the reflecting surfaces into the line of vision of the driver, depending upon whether the mirror is to be used for day driving or night driving.

Another object of the invention is the provision of a rear view mirror assembly embodying a case within which the mirror unit is reversibly mounted, the several parts of the assembly being so associated with one another as to provide a simple, compact arrangement which may be easily actuated by the driver of the vehicle to effect reversal of the mirror unit relative to the case.

A further object of the invention is the provision of a rear view mirror assembly embodying a case, the front of which is open, and a rotatably mounted reversible mirror unit closing the front of the case when in normal operative position and movable bodily forwardly with respect thereto upon reversal thereof, means being provided to normally maintain the mirror in viewing position, and cooperating means on the case and mirror unit for guiding the mirror unit during reversal thereof.

A further object of the invention is the provision of a rear view mirror assembly embodying spring means for facilitating the reversing of the mirror unit, together with means for locating the mirror in proper operative position with respect to the case, whereby either the day driving or night driving mirror surface can be selectively brought into the line of vision of the driver without requiring his visual attention or the taking of his eyes from the road.

A still further object of the invention is the provision of a rear view mirror assembly of the above character in combination with means for supporting the same upon the structure of a vehicle for bodily adjustment relative to its supporting structure to bring the mirror unit into any desired angular position to accommodate persons of different height and seating position.

Other objects and advantages of the invention will become more apparent during the course of the following description, when taken in connection with the accompanying drawings.

In the drawings, wherein like numerals are employed to designate like parts throughout the same:

Fig. 1 is a front elevation of a rear view mirror constructed in accordance with the invention;

Fig. 2 is a vertical transverse section taken on line 2—2 of Fig. 1;

Fig. 3 is a similar vertical transverse section but showing the mirror unit in partially reversed position;

Fig. 4 is a horizontal section taken on line 4—4 of Fig. 1; and

Fig. 5 is a perspective view of one end portion of the mirror.

Referring now to the drawings, there is shown a rear view mirror constructed in accordance with the invention, and which is designated in its entirety by the letter A. The mirror assembly A comprises generally a case 10, adjustably supported within an automobile or the like by a mounting means B, and carrying a reversible mirror unit 11.

Although the invention is not limited to the use of any specific type of reversible mirror unit 11, it may be composed, as herein shown by way of example, of two mirror elements 12 and 13 arranged back to back and mounted in a bezel 14. The mirror elements 12 and 13 have their inner, adjacent surfaces provided with reflective coatings 15 and 16 respectively, of different reflecting values, with one mirror coating being highly reflecting and suitable for daytime driving and the other mirror coating having a lower reflecting value suitable for nighttime driving. The mirror unit 11 is rotatably associated with the case 10 in such a manner that either mirror element 12 or 13 may be selectively brought by the driver of the vehicle into operative position in his line of vision.

The case 10 is preferably rectangular in outline and substantially semi-cylindrical in cross section. More particularly, the case comprises a transversely arcuate rear wall 17 and opposite end walls 18, with the said case being open at the front. Mounted within the case is a liner plate 19 having a corresponding arcuate rear wall 20 and opposite end walls 21, which fit in close, contacting relation with the similarly shaped walls of the case 10.

The rear wall 20 of liner plate 19 is formed along its upper and lower marginal edges with longitudinal grooves 22 and 23 respectively, which are adapted to receive the bezel 14 of the mirror unit 11 when the latter is in normal operating position wtihin the case as shown in Fig. 2. The liner plate may be secured within the case by rolling the upper and lower longitudinal edges of the case over the outer surfaces of the groves 22 and 23 as indicated at 24 and 25 respectively.

The rear wall 20 of the liner plate is also provided with parallel transverse grooves 26, which are preferably equally spaced inwardly from the opposite end walls 21 thereof, and which extend from the upper longitudinal groove 22 to the lower longitudinal groove 23. The transverse grooves 26 are positioned to receive raised portions or bosses 27 formed on the opposite sides of the bezel 14 when the mirror unit 11 is rotated, whereby to reduce frictional contact between the bezel and liner plate and, at the same time, hold the mirror unit from endwise movement during such rotation.

The mirror unit 11 is supported upon the case 10 by pairs of link members 28 and 29 which are arranged at opposite ends of the bezel 14 and which are pivotally and slidably carried by the end walls 21 of liner plate 19. The links 28 and 29 of each pair are provided at their inner ends with slots 30 by which they are supported on studs 31 anchored in the end walls of the liner plate. The studs 31 have enlarged heads 32 which prevent accidental separation of the parts during reversal of the mirror unit, and preferably the inner ends of the slots are enlarged as at 33 to receive the stud heads 32 during assembly of the links on said studs.

Each pair of links 28 and 29 have their outer ends arranged in overlapping relation and are provided with aligned openings 34 which provide journals for the trunnions 35 and 36 secured to the opposite ends of the bezel 14 along the longitudinal axis thereof. When the mirror unit 11 is rotated, as shown in Fig. 3, the links 28 and 29 will pivot on the studs 31 and simultaneously slide forwardly with respect thereto as the trunnions 35 and 36 are carried outwardly of the case. Thus, the slotted arrangement of the links and their manner of supporting the bezel by the trunnions 35 and 36 permits the use of a relatively shallower case 10 than were such arrangement not provided.

When the mirror unit 11 is in normal operating position within the case as shown in Fig. 2, the links 28 and 29 of each pair are disposed in vertical alignment with one another. This relation is maintained by a pair of leaf springs 37 which are anchored at their opposite ends 38 in notches in the edges of the links 28 and 29. The springs 37 are under compression so that they normally tend to expand and thus constantly urge the links into vertical alignment with one another to return the mirror unit to its position within the case. When in such position, the bosses 27 on bezel 14 are received within the longitudinal grooves 22 and 23 in liner plate 19.

One of the trunnions 35 or 36 is provided with a hand knob 39 or other suitable finger grip which is employed to rotate the bezel 14 and thus effect reversal of the mirror unit 11 with respect to the case. When the associated parts are in normal operating position so as to locate one of the mirror elements in viewing position, the trunnions 35 and 36 are received in aligned notches 40 provided in the end walls 18 and 21 of the case 10 and liner plate 19 respectively.

In operation, and when the driver desires to reverse the positions of the mirror elements 12 and 13, it is simply necessary for him to grasp and turn the hand knob 39. Upon rotation of the mirror unit, the bosses 27 leave the longitudinal grooves 22 and 23 and enter and travel in the transverse grooves 26. Simultaneously, the links 28 and 29 pivot upon and also slide forwardly along the studs 31 whereupon the trunnions 35 and 36 are carried outwardly of the case. During such rotation of the mirror unit, the leaf springs 37 act to maintain the bosses 27 formed on the bezel in intimate contact with the grooves 26. The extreme forward position of the trunnions 35 and 36 is shown in Fig. 3, at which time the mirror unit has been rotated 45 degrees so that it has completed one-half of its reversing movement. When the mirror unit passes beyond this point, the springs 37 act to return the links and mirror unit inwardly toward the case and when the mirror unit reaches its normal operating position, the bosses 27 on the bezel will snap firmly into the grooves 22 and 23. Simultaneously, the trunnions 35 and 36 will be received within the notches 40.

Another important feature of the rear view mirror herein provided is that the rear wall 17 of the case acts as a cover for the mirror surface facing said rear wall to shield the same from the headlights of oncoming vehicles and thereby prevent incidental reflections in the windshield of the vehicle created by oncoming traffic. Thus, the out-of-vision reflecting surface is normally in a position to receive light rays that may originate in approaching car lights, sunlight, and reflections from either source. These light rays can and will, unless the mirror is shielded therefrom, be reflected back toward the windshield of the vehicle and create disturbing sources of conflicting light or areas of scattered light therefrom which may materially interfere with driving safety and comfort. The rear wall 17 of the case in serving as a cover for the adjacent reflecting surface of the mirror prevents such incidental reflections.

The mirror assembly A is preferably adjustably supported within an automobile by the mounting means B so that it may be bodily adjusted to any desired angular position to accommodate persons of different height and seating position. One form of such adjustable mounting comprises an arm 41 having a threaded end portion 42 by which it is attached to the vehicle frame. Opposite the threaded portion, the arm is provided with a reduced shank 43 which terminates in a ball end 44 as shown in Fig. 2. The ball 44 projects through an opening 45 in a raised portion 46 formed on the rear wall 17 of the case 10 and a complementary opening 47 in a similar raised portion 48 on the rear wall 20 of liner plate 19 and is mounted in a spherical bearing or seat 49 formed in the liner plate in alignment with openings 45 and 47. The ball 44 is retained in this seat by a metal strap 50 suitably secured to the liner plate and having a centrally formed bearing surface 51 conforming to and engaging the said ball. The bearing surfaces 49 and 51 of the liner plate and retaining strap respectively coact to grip the ball 44 of the mounting arm 41 with sufficient force to maintain the mirror assembly stationary except when it is desired or necessary to adjust the mirror unit bodily to accommodate the driver.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a rear view mirror for automobiles and the like, a case having a transversely arcuate rear wall and forwardly directed end walls and being open at the front, mounting means for the case carried by the rear wall thereof, a mirror unit substantially closing the front of the case and releasably engaged by the top and bottom walls thereof when in normal operating position and having oppositely disposed reflecting surfaces of different reflecting values, one adapted for day driving and the other for night driving, and link members pivotally and slidably carried at their inner ends by the end walls of the case and having their outer ends arranged in overlapping relation, the mirror unit being arranged between the overlapping outer ends of the link members and rotatably carried thereby so that the mirror unit can be reversed in a vertical plane to present the desired reflecting surface to the driver.

2. In a rear view mirror for automobiles and the like, a case having a transversely arcuate rear wall and forwardly directed end walls and being open at the front, mounting means for the case carried by the rear wall thereof, a mirror unit substantially closing the front of the case and releasably engaged by the top and bottom walls thereof when in normal operating position and having oppositely disposed reflecting surfaces of different reflecting values, one adapted for day driving and the other for night driving, link members pivotally and slidably carried at their inner ends by the end walls of the case and having their outer ends arranged in overlapping relation, the mirror unit being carried on its longitudinal center line between the overlapping outer ends of the link members and rotatably carried thereby so that the mirror unit can be reversed in a vertical plane to present the desired reflecting surface to the driver, and spring means normally urging the mirror unit inwardly into contact with the arcuate rear wall of the case during rotation thereof.

3. In a rear view mirror for automobiles and the like, a case having a rear wall and forwardly directed end walls and being open at the front, mounting means for the case carried by the rear wall thereof, a mirror unit substantially closing the front of the case and releasably engaged by the top and bottom walls thereof when in normal operating position and having oppositely disposed reflecting surfaces of different reflecting values, one adapted for day driving and the other for night driving, link members pivotally and slidably carried at their inner ends by the end walls of the case and having their outer ends arranged in overlapping relation, the mirror unit being carried on its longitudinal center line between the overlapping outer ends of the link members and rotatably carried thereby so that the mirror unit can be reversed in a vertical plane to present the desired reflecting surface to the driver, and means on the upper and lower edges of the mirror unit engaging the rear wall of the case for guiding the said mirror unit during rotation thereof.

4. In a rear view mirror for automobiles and the like, a case having a rear wall and forwardly directed end walls and being open at the front, mounting means for the case carried by the rear wall thereof, a mirror unit substantially closing the front of the case when in normal operating position and having oppositely disposed reflective surfaces of different reflecting values, on adapted for day driving and the other for night driving, a pair of link members pivotally and slidably carried at their inner ends by each end wall of the case and having their outer ends overlapping one another, the mirror unit being mounted between the pairs of links and having trunnions journaled in the overlapping outer ends thereof whereby the mirror unit can be rotated to present the desired reflecting surface to the driver, and cooperating means on the rear wall of the case and upper and lower edges of the mirror unit for guiding the latter during rotation thereof.

5. In a rear view mirror for automobiles and the like, a case having a rear wall and forwardly directed end walls and being open at the front, mounting means for the case carried by the rear wall thereof, a mirror unit substantially closing the front of the case when in normal operating position and having oppositely disposed reflective surfaces of different reflecting values, one adapted for day driving and the other for night driving, a pair of link members pivotally and slidably carried at their inner ends by each end wall of the case and having their outer ends overlapping one another, the mirror unit being mounted between the pairs of links and having trunnions journaled in the overlapping outer ends thereof whereby the mirror unit can be rotated to present the desired reflecting surface to the driver, cooperating means on the rear wall of the case and upper and lower edges of the mirror unit for guiding the latter during rotation thereof, and spring means carried by the link members for normally urging the mirror unit inwardly into contact with the rear wall of the case during rotation thereof.

6. In a rear view mirror for automobiles and the like, a case having a rear wall and forwardly directed end walls and being open at the front, mounting means for the case carried by the rear wall thereof, a mirror unit substantially closing the front of the case when in normal operating position and having oppositely disposed reflective surfaces of different reflecting values, one adapted for day driving and the other for night driving, a pair of link members pivotally and slidably carried at their inner ends by each end wall of the case and having their outer ends overlapping one another, the mirror unit being mounted between the pairs of links and having trunnions journaled in the overlapping outer ends thereof whereby the mirror unit can be rotated to present the desired reflecting surface to the driver, and means carried by the mirror unit and received within grooves in the rear wall of the case for guiding the said mirror unit during rotation thereof.

7. In a rear view mirror for automobiles and the like, a case having a rear wall and forwardly directed end walls and being open at the front, mounting means for the case carried by the rear wall thereof, said case having longitudinal grooves along the upper and lower edges thereof, a mirror unit substantially entirely received within the case and having its upper and lower edges disposed in said grooves when in normal operating position, said mirror unit having oppositely disposed reflective surfaces of different reflecting values, one adapted for day driving and the other for night driving, means normally received within the case connecting the mirror unit to the case at the opposite ends thereof of such character that the mirror unit is rotatable relative to the case to present the desired reflecting surface to the driver, and cooperating means on the rear wall of the case and upper and lower edges of the mirror unit for guiding the latter during rotation thereof.

8. In a rear view mirror for automobiles and the like, a case having a rear wall and forwardly directed end walls and being open at the front, mounting means for the case carried by the rear wall thereof, said case having longitudinal grooves along the upper and lower edges thereof, a mirror unit substantially entirely received within the case and having its upper and lower edges disposed in said grooves when in normal operating position, said mirror unit having oppositely disposed reflective surfaces of different reflecting values, one adapted for day driving and the other for night driving, means normally received within the case connecting the mirror unit to the case at the opposite ends thereof of such character that the mirror unit is rotatable relative to the case to present the desired reflecting surface to the driver, spring means for urging the mirror unit into contact with the rear wall of the case during rotation thereof and for maintaining the said mirror unit within said grooves when in normal operating position, and cooperating means on the rear wall of the case and upper and lower edges of the mirror unit for guiding the latter during rotation thereof.

9. In a rear view mirror for automobiles and the like, a case having a rear wall and forwardly directed end walls and being open at the front, mounting means for the case carried by the rear wall thereof, said case having longitudinal grooves along the upper and lower edges thereof and transverse grooves in the rear wall extending between the longitudinal grooves, a mirror unit received within the case and having its upper and lower edges disposed in said longitudinal grooves when in normal operating position, said mirror unit having oppositely disposed reflective surfaces of different reflecting values, one adapted for day driving and the other for night driving, link members pivotally and slidably carried at their inner ends by the end walls of the case, the mirror unit being arranged between the outer ends of the link members and rotatably carried thereby so that the mirror unit can be reversed to present the desired reflecting surface to the driver, and means on the mirror unit which are received in said transverse grooves during rotation of the said mirror unit.

10. In a rear view mirror for automobiles and the like, a case having a rear wall and forwardly directed end walls and being open at the front, mounting means for the case carried by the rear wall thereof, said case having longitudinal grooves along the upper and lower edges thereof and transverse grooves in the rear wall extending between the longitudinal grooves, a mirror unit received within the case and having its upper and lower edges disposed in said longitudinal grooves when in normal operating position, said mirror unit having oppositely disposed reflective surfaces of different reflecting values, one adapted for day driving and the other for night driving, link members pivotally and slidably carried at their inner ends by the end walls of the case and having their outer ends overlapping one another, the mirror unit being mounted between the pairs of links and having trunnions journaled in the overlapping ends thereof whereby the mirror unit can be rotated to present the desired reflecting surface to the driver, means on the mirror unit which are received in said transverse grooves during the rotation of the mirror unit, and spring means carried by the link members for maintaining said last named means within said transverse grooves during rotation of the mirror unit and for positioning the said mirror unit within said longitudinal grooves when in normal operating position.

References Cited in the file of this patent

UNITED STATES PATENTS

| | | |
|---|---|---|
| 401,921 | Anderson | Apr. 23, 1889 |
| 1,541,451 | Wallace | June 9, 1925 |
| 1,622,554 | Wallace | Mar. 29, 1927 |
| 1,625,011 | Wolfe et al. | Apr. 19, 1927 |
| 1,864,015 | Fotakis | June 21, 1932 |
| 1,875,554 | Bell | Sept. 6, 1932 |
| 2,235,284 | Carver | Mar. 18, 1941 |
| 2,307,532 | Murphy | Jan. 5, 1943 |
| 2,356,432 | Roedding | Aug. 22, 1944 |

FOREIGN PATENTS

| | | |
|---|---|---|
| 45,410 | France | May 20, 1935 |

(Addition to 771,551)